(12) United States Patent
Paik et al.

(10) Patent No.: US 12,431,492 B2
(45) Date of Patent: Sep. 30, 2025

(54) ANODE ACTIVE MATERIAL, METHOD FOR MANUFACTURING SAME, AND LITHIUM SECONDARY BATTERY COMPRISING SAME

(71) Applicant: INDUSTRY-UNIVERSITY COOPERATION FOUNDATION HANYANG UNIVERSITY, Seoul (KR)

(72) Inventors: Un Gyu Paik, Seoul (KR); Tae Seup Song, Seoul (KR); Dong Soo Lee, Daejeon (KR); Se Ho Sun, Seoul (KR); Seung Woo Lee, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 946 days.

(21) Appl. No.: 17/605,793

(22) PCT Filed: Mar. 17, 2020

(86) PCT No.: PCT/KR2020/003636
§ 371 (c)(1),
(2) Date: Apr. 19, 2022

(87) PCT Pub. No.: WO2020/218739
PCT Pub. Date: Oct. 29, 2020

(65) Prior Publication Data
US 2022/0263084 A1    Aug. 18, 2022

(30) Foreign Application Priority Data

Apr. 23, 2019 (KR) .................. 10-2019-0047564
Aug. 29, 2019 (KR) .................. 10-2019-0106518
Feb. 17, 2020 (KR) .................. 10-2020-0019187

(51) Int. Cl.
*H01M 4/485* (2010.01)
*H01M 4/04* (2006.01)
(Continued)

(52) U.S. Cl.
CPC ......... *H01M 4/485* (2013.01); *H01M 4/0407* (2013.01); *H01M 4/366* (2013.01);
(Continued)

(58) Field of Classification Search
None
See application file for complete search history.

(56) References Cited

U.S. PATENT DOCUMENTS

| 9,350,015 | B2 | 5/2016 | Shin et al. | |
| 2014/0099251 | A1* | 4/2014 | Kang | D01F 9/08 423/598 |
| 2019/0273247 | A1* | 9/2019 | Lee | H01M 4/364 |

FOREIGN PATENT DOCUMENTS

| KR | 10-2011-0126330 A | 11/2011 |
| KR | 10-2012-0118791 A | 10/2012 |

(Continued)

OTHER PUBLICATIONS

International Search Report for PCT/KR2020/003636 dated Jun. 25, 2020 [PCT/ISA/210].
(Continued)

Primary Examiner — Alix E Eggerding
(74) Attorney, Agent, or Firm — Sughrue Mion, PLLC

(57) ABSTRACT

The present invention relates to an anode active material including a composite of lithium titanium oxide (LTO), a silicon-containing material and crystalline carbon, a method for manufacturing the same, and a lithium secondary battery including the same. The composite according to the present invention satisfies high capacity, high energy density and high lifespan stability, improves fast charging characteris-
(Continued)

tics, and also improves mechanical strength, so a lithium secondary battery using the composite as an anode active material can be usefully used for a next-generation electric vehicle, energy storage systems, etc.

14 Claims, 9 Drawing Sheets

(51) Int. Cl.
    *H01M 4/36*     (2006.01)
    *H01M 4/38*     (2006.01)
    *H01M 4/583*     (2010.01)
    *H01M 10/052*     (2010.01)
    *H01M 4/02*     (2006.01)

(52) U.S. Cl.
    CPC ........... *H01M 4/386* (2013.01); *H01M 4/583* (2013.01); *H01M 10/052* (2013.01); *H01M 2004/021* (2013.01)

(56) References Cited

FOREIGN PATENT DOCUMENTS

| | | | |
|---|---|---|---|
| KR | 101280914 | * | 7/2013 |
| KR | 10-2017-0059535 A | | 5/2017 |
| KR | 10-2018-0031585 A | | 3/2018 |
| KR | 10-1902467 B1 | | 9/2018 |
| KR | 10-2018-0107014 A | | 10/2018 |
| WO | 2018/174573 A1 | | 9/2018 |

OTHER PUBLICATIONS

Written Opinion for PCT/KR2020/003636 dated Jun. 25, 2020 [PCT/ISA/237].

* cited by examiner

[FIG. 1a]
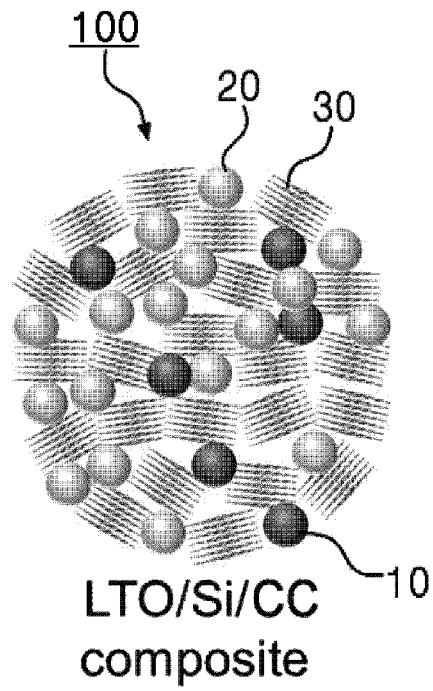
[FIG. 1b]
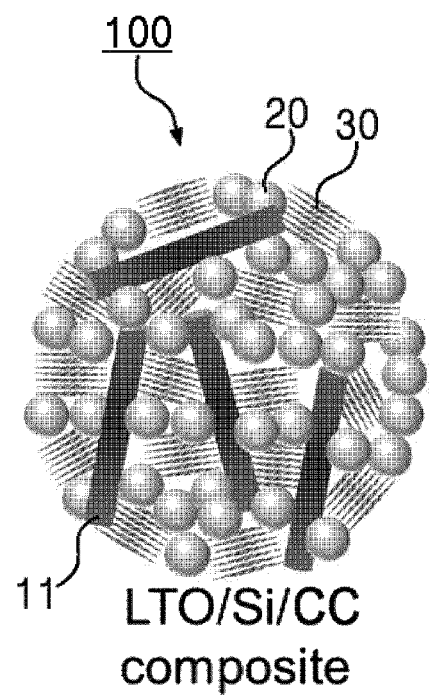

[FIG. 2a]
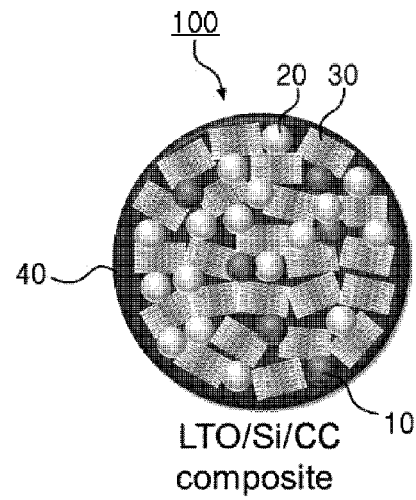
LTO/Si/CC composite
[FIG. 2b]
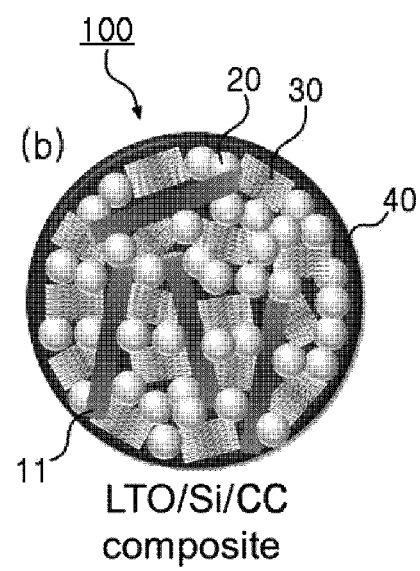
LTO/Si/CC composite

[FIG. 3]
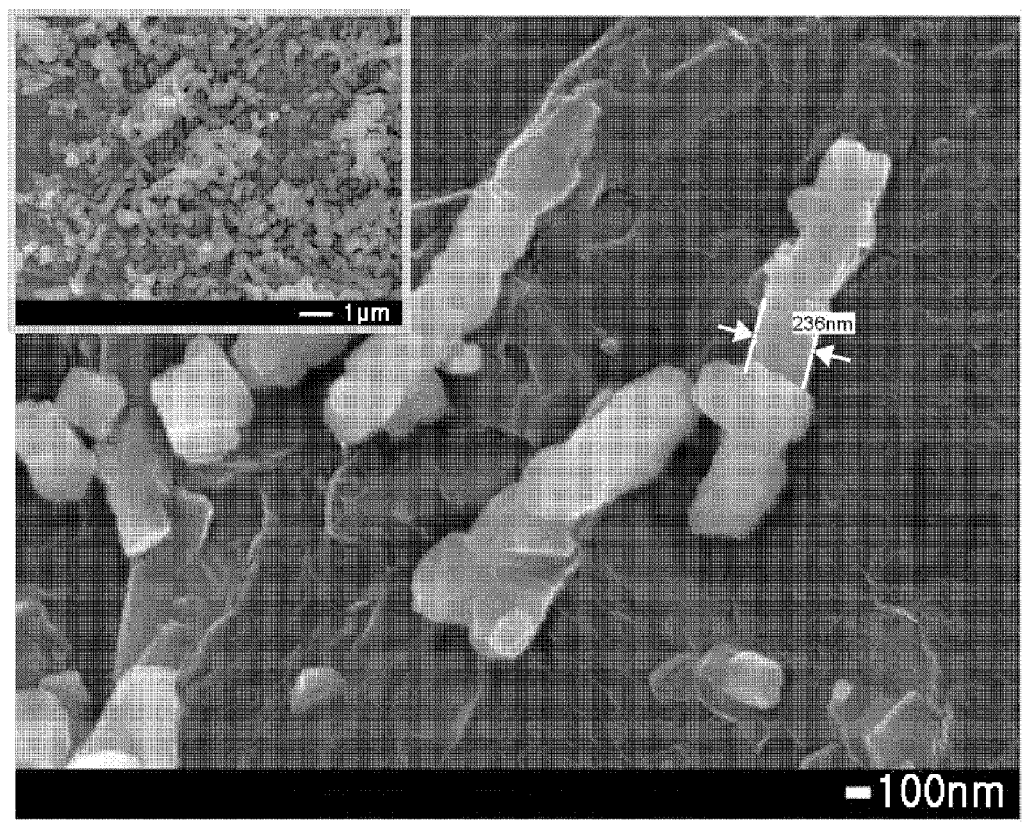

[FIG. 4]
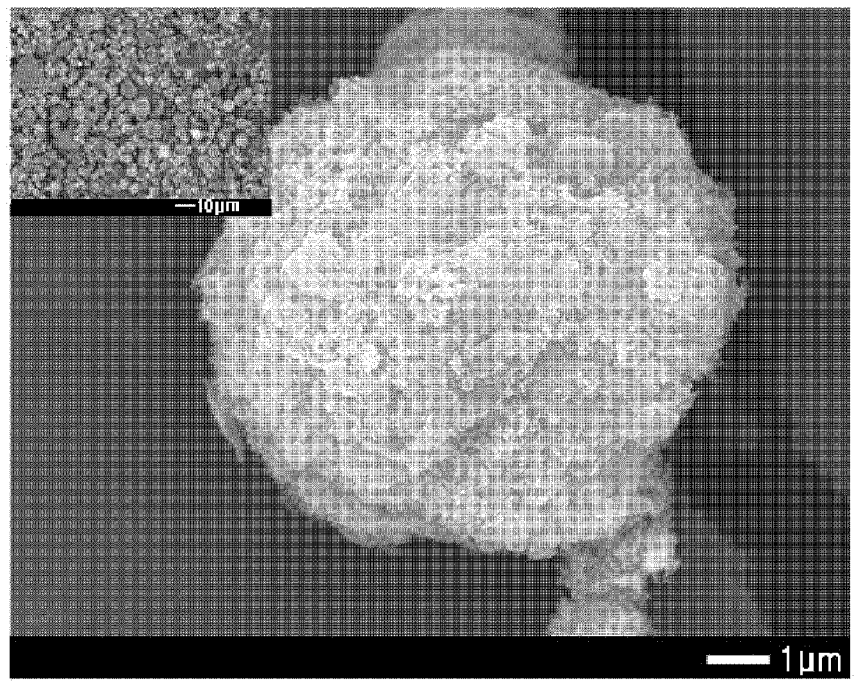
[FIG. 5]
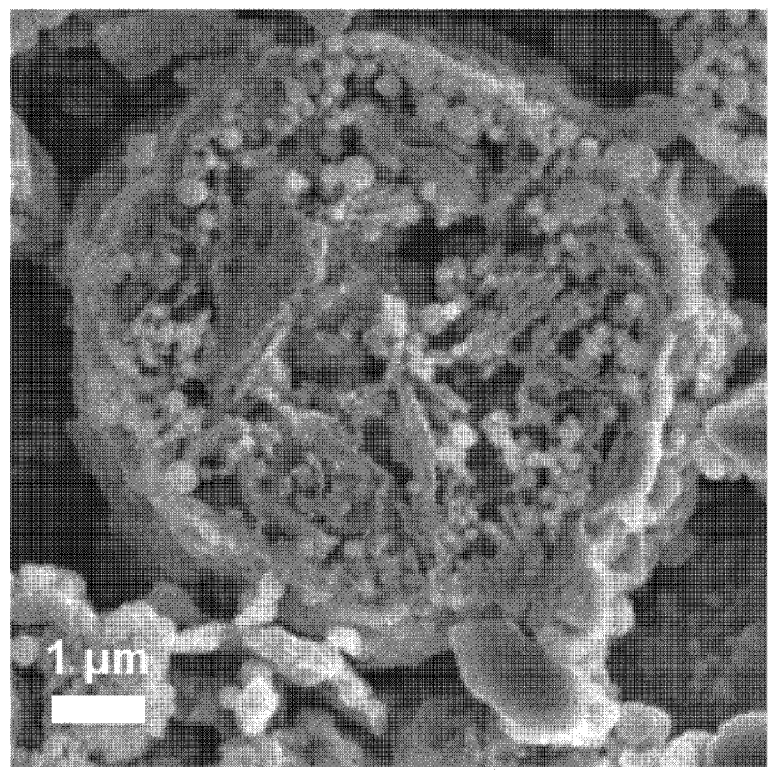

[FIG. 6]
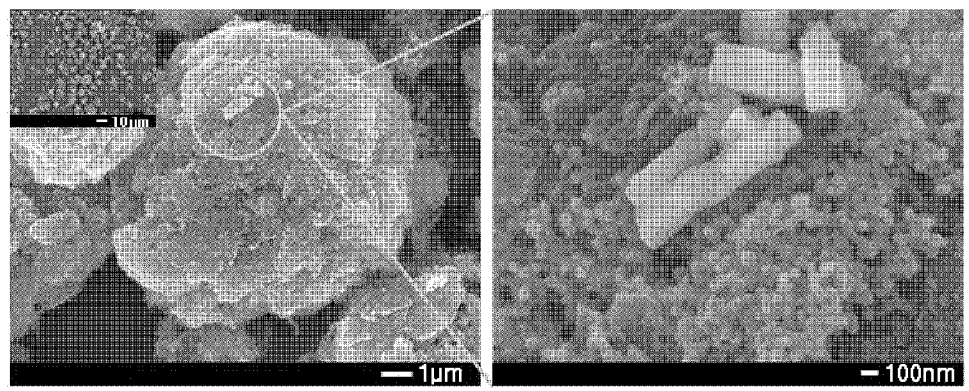
[FIG. 7a]
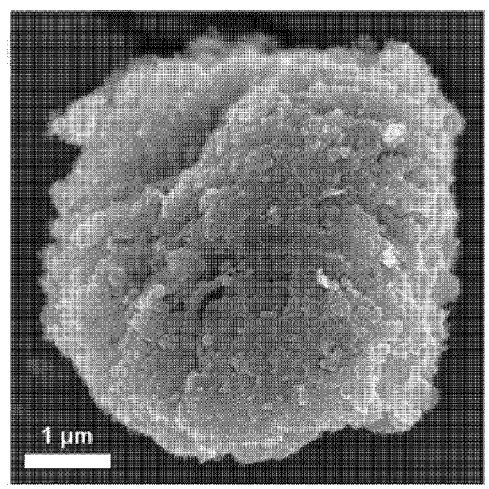
[FIG. 7b]
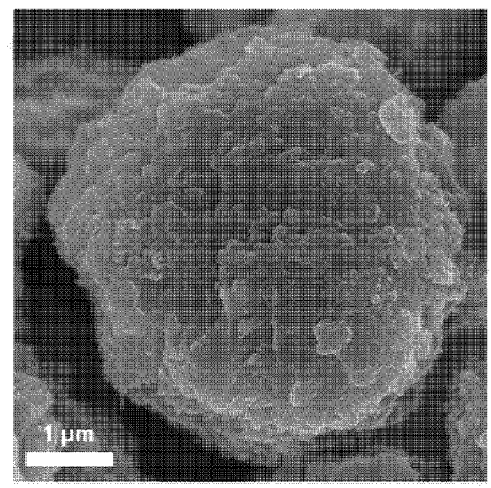

[FIG. 8]
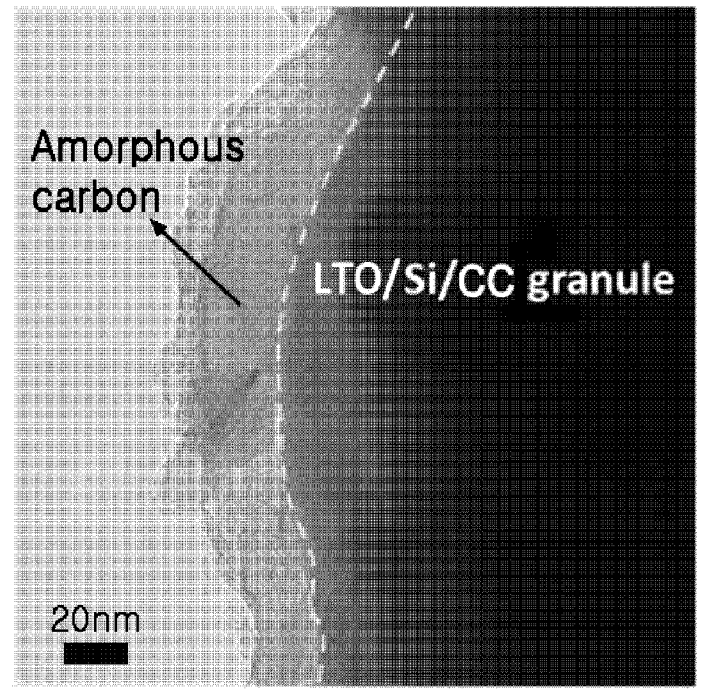
[FIG. 9]
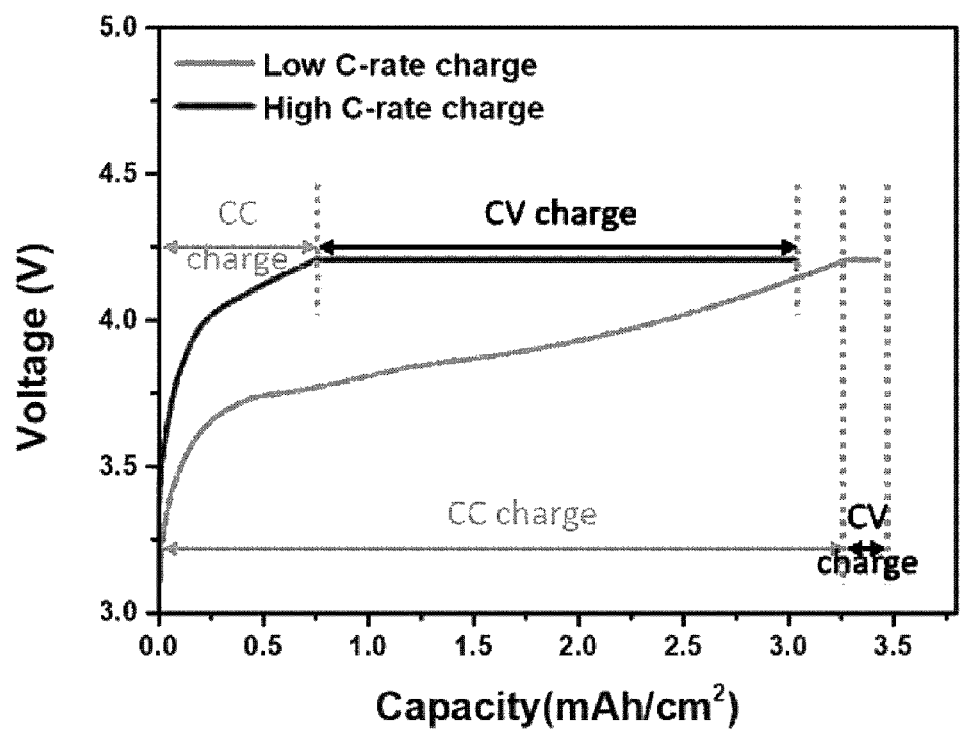

[FIG. 10a]
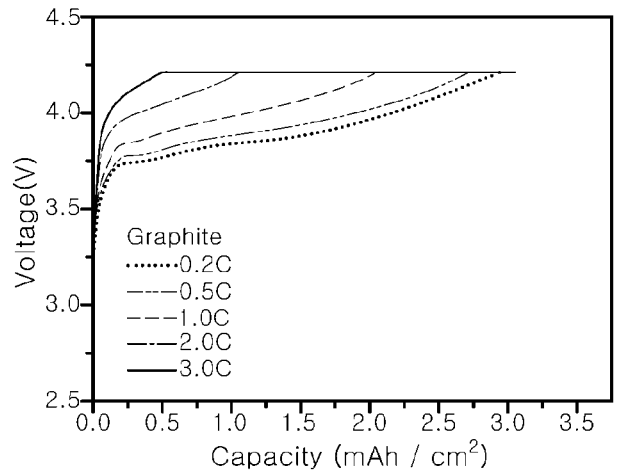
[FIG. 10b]
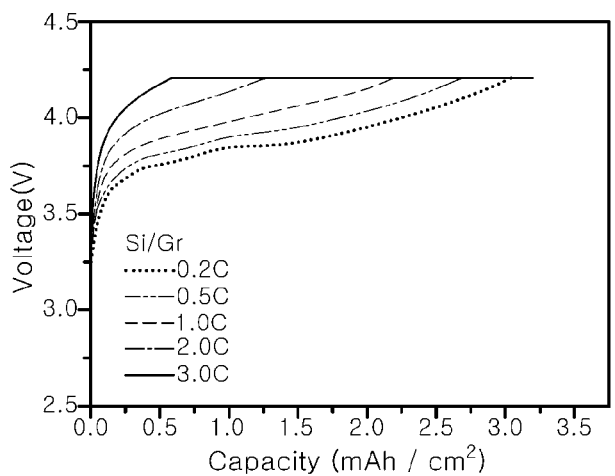
[FIG. 10c]
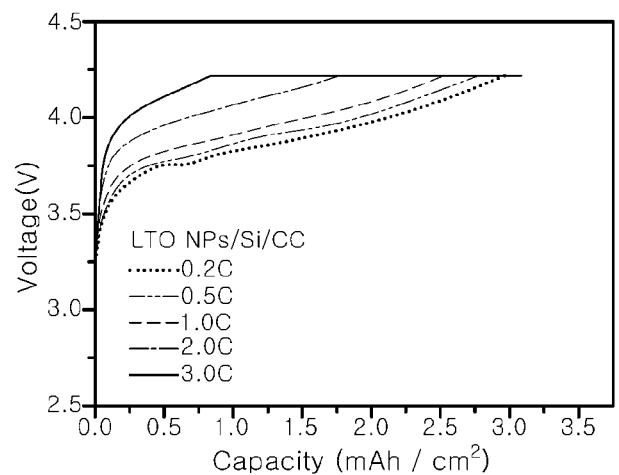

[FIG. 10d]
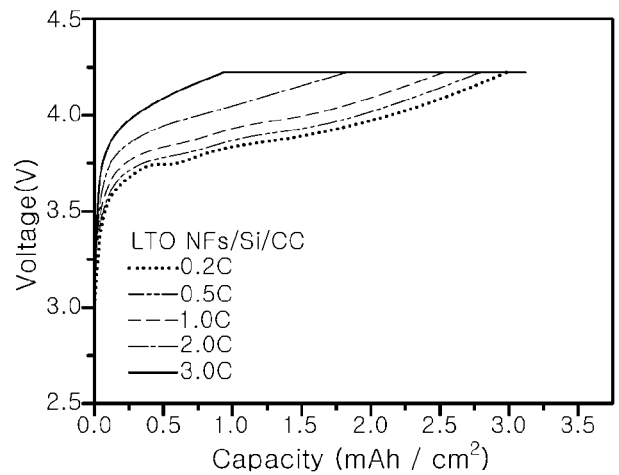
[FIG. 11]
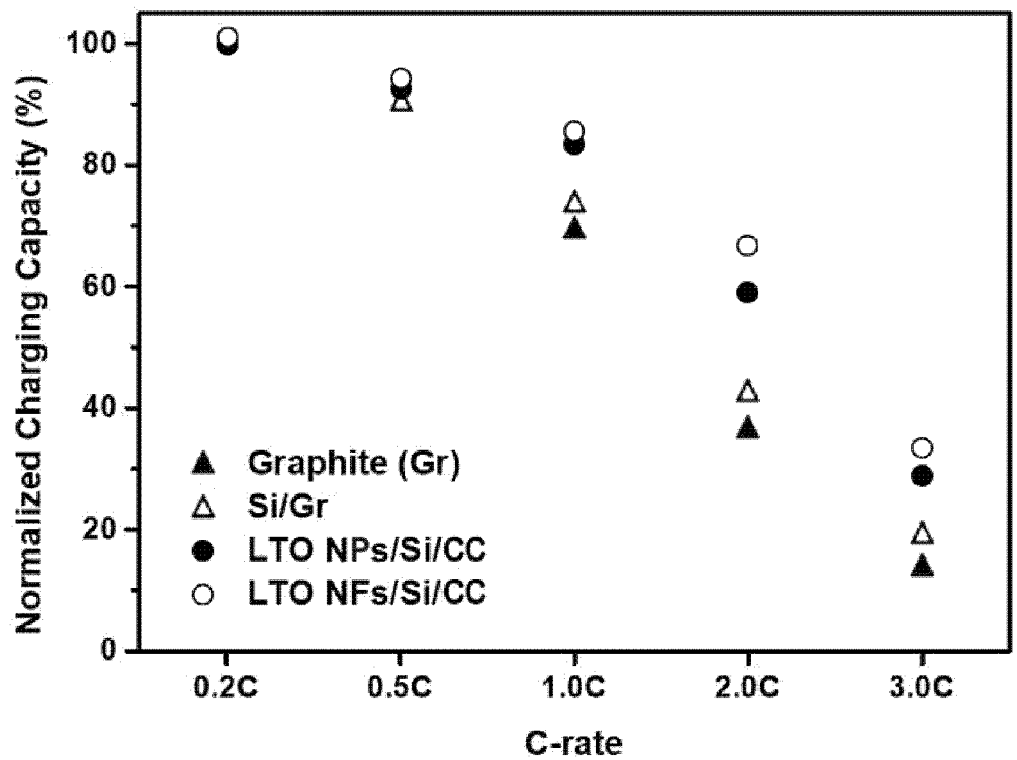

[FIG. 12]
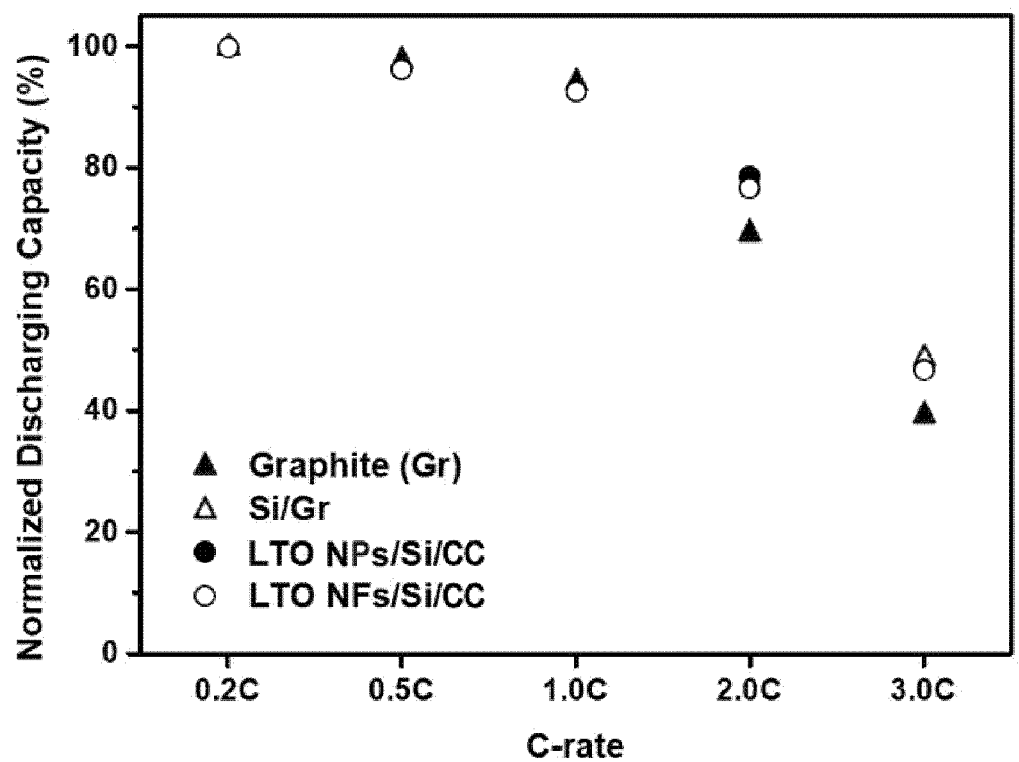

ANODE ACTIVE MATERIAL, METHOD FOR MANUFACTURING SAME, AND LITHIUM SECONDARY BATTERY COMPRISING SAME

TECHNICAL FIELD

The present invention relates to a secondary battery, and more particularly, to a lithium secondary battery.

BACKGROUND ART

The lithium secondary battery system is mainly composed of three elements. These are an anode that stores lithium during charging, a cathode that receives lithium during discharging, and an electrolyte in which lithium moves between the anode and the cathode. Currently, graphite is used as an anode, and artificial graphite is known to have a reversible capacity of about 350 mAh/g. In addition, lithium cobalt oxide ($LCoO_2$, LCO) is generally widely used for an active material in the cathode and has a reversible capacity of about 160 mAh/g. As an electrolyte, a liquid electrolyte is mainly used, and the liquid electrolyte in which lithium salt ($LiPF_6$) is added to a carbonate-based organic solvent is typically used. That is, during charging, lithium ions in the lattice of lithium cobalt oxide move into the graphite through the electrolyte, and during discharging, lithium having been inserted into the graphite moves back into the lattice of the lithium cobalt oxide. This lithium secondary battery system is a system that stores (charges) and consumes (discharges) energy using limited amount of lithium ions present in the cathode.

As described above, graphite is mainly used as an anode material for lithium secondary batteries, and accordingly, commercial active materials of secondary batteries have been developed to the extent that they can exhibit performance close to theoretical capacity. Therefore, it is difficult to overcome the material limit with the graphite material.

Accordingly, in order to prepare for the 4th industry, a next-generation lithium secondary battery with high capacity and high energy density is required. Energy density is an important issue in electric vehicles or small electronic devices where space is limited. Accordingly, as an anode material, researches on silicon-based materials having a high theoretical capacity (approximately 3572 mAh/g at room temperature), which can contribute to improving energy density, are being conducted. However, when silicon is used as an electrode material, there is an issue of volume expansion. In order to solve this problem, research has been conducted to alleviate the volume change by compounding the graphite or carbon material and the silicon material. At the same time, in the commercialization of electric vehicles, it is a very important topic not only to increase the energy density but also to improve the fast charging characteristics of the secondary battery.

DISCLOSURE

Technical Problem

The present invention is directed to providing a secondary battery that exhibits high-speed charging characteristics while having a high capacity and high energy density.

The technical problems of the present invention are not limited to the technical problems mentioned above, and other technical problems not mentioned will be clearly understood by those skilled in the art from the following description.

Technical Solution

One aspect of the present invention provides an anode active material comprising a lithium titanium oxide-silicon-crystalline carbon composite. The anode active material is a composite in which lithium titanium oxide (LTO), a silicon-containing material, and crystalline carbon are mixed, and may include a lithium titanium oxide-silicon-crystalline carbon composite which is a porous spherical particle having a plurality of pores therein.

The silicon-containing material may be silicon, silicon oxide, silicon carbide, a silicon alloy, or a combination thereof.

The silicon-containing material may be a zero-dimensional nanoparticle or nanoporous body, or a one-dimensional nanowire, nanorod, or nanofiber.

The content of the silicon-containing material may be 3 to 60 parts by weight.

The lithium titanium oxide may be represented by the following Formula 1.

$$Li_xTi_yO_z \qquad \text{[Formula 1]}$$

In Formula 1, $0.1 \leq x \leq 4$, $1 \leq y \leq 5$ and $2 \leq z \leq 12$.

The lithium titanium oxide may be selected from the group consisting of $Li_4Ti_5O_{12}$, $LiTi_2O_4$, $Li_2TiO_3$ and $Li_2Ti_3O_7$.

The lithium titanium oxide may be a zero-dimensional nanoparticle or nanoporous body, a one-dimensional nanowire, nanorod or nanofiber, or a two-dimensional nanosheet.

The content of the lithium titanium oxide may be 0.1 to 10 parts by weight.

The crystalline carbon may be selected from the group consisting of graphene, graphite, expanded graphite, and carbon nanotubes (CNT).

The content of the crystalline carbon may be 30 to 95 parts by weight.

A carbon coating layer may be further included on the surface of the composite.

Another aspect of the present invention provides a method of manufacturing an anode active material. The method for preparing the anode active material includes preparing a dispersion solution in which lithium titanium oxide (LTO), a silicon-containing material, crystalline carbon, and a dispersant are mixed (S10); and spray-drying the dispersion to prepare a porous lithium titanium oxide-silicon-crystalline carbon composite (S20).

The method for preparing the anode active material further includes mixing the lithium titanium oxide-silicon-crystalline carbon composite obtained in step S20 with amorphous carbon, and then modifying a surface through a milling method at a temperature lower than the softening point of the amorphous carbon (S31); and carbonizing the surface-modified lithium titanium oxide-silicon-crystalline carbon composite to form a uniform amorphous carbon coating layer on the surface of the lithium titanium oxide-silicon-crystalline carbon composite (S32).

Still another aspect of the present invention provides an electrode for a lithium secondary battery. The electrode may include an active material including a lithium titanium oxide-silicon-crystalline carbon composite. The composite is a composite in which lithium titanium oxide (LTO), a silicon-containing material, and crystalline carbon are mixed, and is a porous spherical particle having a plurality of pores therein.

Still another aspect of the present invention provides a lithium secondary battery. The lithium secondary battery includes an anode coated with an anode active material comprising a lithium titanium oxide-silicon-crystalline carbon composite; a cathode positioned opposite to the anode; and an electrolyte disposed between the anode and the cathode.

Advantageous Effects

According to the present invention, the lithium titanium oxide-silicon-crystalline carbon composite contains a silicon-containing material, so it has a higher specific capacity than a conventional graphite material, so the energy density of the battery can be improved. The composite contains crystalline carbon to improve stability by alleviating the volume change of silicon, and the composite includes a one-dimensional (1D) structure LTO material to secure uniform and fast electrical conductivity and lithium ion conductivity within the composite thereby greatly improving the fast charging (Q/C) characteristics of the secondary battery. In addition, since the composite includes internal pores, it is possible to greatly improve the lifespan characteristics at a high rate as anode material of a secondary battery.

In addition, according to the present invention, the composite includes the LTO material, which is a metal material, to improve the mechanical strength of the composite particles, thus, the destruction of the particles during the rolling process of the electrode can be reduced.

Therefore, the composite according to the present invention allows the secondary battery to have high capacity, high energy density, and high lifespan stability, improve the fast charging characteristics of the secondary battery, and also have excellent mechanical strength. Therefore, the lithium secondary battery using the composite as an anode active material can be usefully used in next-generation electric vehicles, energy storage systems, and the like.

The technical effects of the present invention are not limited to those mentioned above, and other technical effects not mentioned will be clearly understood by those skilled in the art from the following description.

DESCRIPTION OF DRAWINGS

FIG. 1a is a schematic view showing the structure of a lithium titanium oxide-silicon-crystalline carbon composite (hereinafter referred to as an LTO/Si/CC composite) according to an embodiment of the present invention.

FIG. 1b is a schematic view showing the structure of an LTO/Si/CC composite including LTO nanofibers according to an embodiment of the present invention.

FIG. 2a is a schematic view showing the structure of an LTO/Si/CC composite including LTO nanoparticles and including a carbon coating layer according to another embodiment of the present invention.

FIG. 2b is a schematic view showing the structure of an LTO/Si/CC composite including LTO nanofibers and including a carbon coating layer according to another embodiment of the present invention.

FIG. 3 is a scanning electron microscope (SEM) image showing the LTO nanofibers (LTO NFs) used in the preparation of the LTO/Si/CC composite according to Preparation Example 2 of the present invention.

FIG. 4 is a scanning electron microscope (SEM) image of the LTO/Si/CC composite including LTO nanoparticles according to Preparation Example 1 of the present invention.

FIG. 5 is a SEM image showing a cross-section of the LTO/Si/CC composite including LTO nanoparticles according to Preparation Example 1 of the present invention.

FIG. 6 is a SEM image of the LTO/Si/CC composite including LTO nanofibers according to Preparation Example 2 of the present invention.

FIG. 7a is a SEM image of the LTO/Si/CC composite including LTO nanoparticles and including a carbon coating layer according to Preparation Example 3 of the present invention.

FIG. 7b is a SEM image of the LTO/Si/CC composite including LTO nanofibers and including a carbon coating layer according to Preparation Example 4 of the present invention.

FIG. 8 is a TEM image showing a cross-section of an LTO NPs/Si/CC composite including a carbon coating layer according to Preparation Example 3 of the present invention.

FIG. 9 is a graph illustrating a charging voltage profile during fast charging or slow charging of a battery charged by a general CC-CV (constant current-constant voltage) method.

FIG. 10a is a graph showing the voltage profile according to the charging rate during constant-current charging of a battery using a composite (graphite) according to Comparative Example 4 of the present invention as an anode active material, and a cathode including $LiCoO_2$.

FIG. 10b is a graph showing the voltage profile according to the charging rate during constant-current charging of a battery using a composite (Si/Gr composite) according to Comparative Example 3 of the present invention as an anode active material, and a cathode including $LiCoO_2$.

FIG. 10c is a graph showing the voltage profile according to the charging rate during constant-current charging of a battery using a composite (LTO NPs/Si/CC composite) according to Preparation Example 5 of the present invention as an anode active material, and a cathode including $LiCoO_2$.

FIG. 10d is a graph showing the voltage profile according to the charging rate during constant-current charging of a battery using a composite (LTO NFs/Si/CC composite) according to Preparation Example 6 of the present invention as an anode active material, and a cathode including $LiCoO_2$.

FIG. 11 is a graph showing the quantified charging capacity (%) at the limit voltage when the charging rate is changed during constant-current charging of a battery using each composite according to Preparation Examples and Comparative Examples as an anode active material.

FIG. 12 is a graph showing the quantified discharge capacity (100% based on 0.2 C) according to the discharge rate during discharging of a battery using each composite according to Preparation Examples and Comparative Examples as an anode active material.

MODES OF THE INVENTION

Since the present invention can have various changes and can have various embodiments, specific embodiments are illustrated in the drawings and described in detail. However, this is not intended to limit the present invention to specific embodiments, and it should be understood that all modifications, equivalents and substitutes included in the spirit and scope of the present invention are included.

The terms used in the present invention are only used to describe specific embodiments, and are not intended to limit the present invention. The singular expression includes the plural expression unless the context clearly dictates otherwise. In the present invention, terms such as "comprise" or "have" are intended to designate that a feature, number, step, operation, component, part, or combination thereof described in the specification exists, but it should be understood that this does not preclude the existence or addition of one or more other features or numbers, steps, operations, components, parts, or combinations thereof.

Unless otherwise defined, all terms used herein including technical or scientific terms have the same meanings as those generally understood by one of ordinary skill in the art. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

As used herein, the term 'silicon-containing material' refers to a material containing a silicon component represented by the element symbol Si, and includes silicon, silicon oxide, silicon carbide, silicon alloy, or a combination thereof.

Anode Active Material Including LTO/Si/CC Composite

The present invention provides an anode active material including a composite (hereinafter referred to as an LTO/Si/CC composite) including lithium titanium oxide (LTO), a silicon-containing material, and crystalline carbon. Such an anode active material can implement a high-capacity lithium secondary battery, and can improve the fast charging performance of the lithium secondary battery.

Hereinafter, the LTO/Si/CC composite, which is the anode active material according to the present invention, will be described in detail.

FIGS. 1a and 1b are schematic views showing the structure of an LTO/Si/CC composite according to an embodiment of the present invention.

Referring to FIGS. 1a and 1b, the LTO/Si/CC composite 100 according to an embodiment of the present invention is a composite in which a lithium titanium oxide (LTO) 10 and 11, silicon-containing material 20 and crystalline carbon 30 are uniformly mixed, and has a shape of a porous spherical particle having a plurality of pores therein.

The lithium titanium oxide (LTO) 10 and 11 may be represented by the following Formula 1.

$$Li_xTi_yO_z \quad \text{[Formula 1]}$$

In Formula 1, $0.1 \leq x \leq 4$, $1 \leq y \leq 5$ and $2 \leq z \leq 12$.

Specifically, the lithium titanium oxides 10 and 11 represented by Formula 1 may be $Li_4Ti_5O_{12}$, $LiTi_2O_4$, $Li_2TiO_3$ or $Li_2Ti_3O_7$, but is not limited thereto.

The lithium titanium oxides 10 and 11 are materials having excellent rate capability, and serve to improve high-rate charge/discharge characteristics and fast-charge performance of a battery.

As the popularization of electric vehicles is expected to arrive, the issue of fast charging performance of lithium secondary batteries becomes important, and the present inventors researched to develop an active material that can improve the fast charging performance of lithium secondary batteries while exhibiting high capacity. As a result of this study, when an LTO/Si/CC composite containing lithium titanium oxide in a predetermined ratio is used as an anode active material, compared to when a conventional silicon-graphite composite (Si/Gr composite) is used as an anode active material, the lithium secondary battery can exhibit a high capacity and improved fast charging performance (see FIGS. 10a to 10d and 11).

The lithium titanium oxides 10 and 11 may have a zero-dimensional, one-dimensional, two-dimensional, three-dimensional structure or a combination thereof. In particular, the lithium titanium oxide having the one-dimensional structure can have excellent electrical conductivity because it is easy to move electrons along a straight passageway. Since the lithium titanium oxide is a metal-based material, the mechanical strength of the active material particles may be improved, and the degree of particle destruction may be reduced during subsequent electrode formation.

The lithium titanium oxides 10 and 11 may be nano-sized, and specifically, nanoparticles, nano-porous bodies, nanowires, nanorods, or nanofibers having a particle diameter of several to hundreds of nanometers.

The lithium titanium oxides 10 and 11 may be doped or coated with a metal element for structural stabilization. As an example, Zr or Nb may be doped into lithium titanium oxide, and Al may be partially doped or coated in the manufacturing process of lithium titanium oxide, but is not limited thereto.

The lithium titanium oxides 10 and 11 may be contained in an amount of 0.1 to 10 parts by weight. If the content of the lithium titanium oxides 10 and 11 is less than 0.1 parts by weight, the performance of fast charging is not effectively represented, and when it exceeds 10 parts by weight, the active material does not exhibit sufficient energy density, or irreversible capacity of the battery may be increased.

In the LTO/Si/CC composite according to the present invention, the silicon-containing material 20 may serve to implement a high capacity and high energy density, and the silicon-containing material 20 may include silicon, silicon oxide, silicon carbide, and silicon alloys, or combinations thereof.

The silicon oxide may be, for example, $SiO_x$ ($0<x<1$).

The silicon carbide may be, for example, SiC.

The silicon alloy may be, for example, a Si—Z' alloy (wherein Z' may be at least one element selected from alkali metals, alkaline earth metals, group 13 elements, group 14 elements, transition metals, rare earth elements, and combinations thereof, but Z' is not Si).

The silicon-containing material 20 may have a structure of a zero-dimensional, one-dimensional, two-dimensional, or three-dimensional structure, or a combination thereof.

The silicon-containing material 20 may have a nano size, and specifically, may be nanoparticles, nanoporous bodies, nanowires, nanorods, or nanofibers having a particle diameter of several to hundreds of nanometers.

The silicon-containing material 20 may be contained in an amount of 3 to 60 parts by weight. If the content of the silicon-containing material is less than 3 parts by weight, it is difficult to effectively exhibit high capacity performance, and if it exceeds 60 parts by weight, the active material may be destroyed according to the volume change of the silicon, and thus the life of the battery may be reduced, and electrode swelling may occur, which may cause stability problems.

In the LTO/Si/CC composite according to the present invention, the crystalline carbon 30 may serve to relieve volume expansion of the silicon-containing material during charging and discharging.

In addition, in manufacturing the composite using the silicon-containing material 20 and the crystalline carbon 30, the internal porosity can be controlled by using an appropriate dispersant and preparing the composite by using a spray drying method. In this case, a porous silicon-containing material-crystalline carbon composite can be formed. The composite may have internal pores, thereby greatly improving the lifespan characteristics of the secondary battery.

In this case, the crystalline carbon 30 may be graphene, graphite, expanded graphite, carbon nanotube (CNT), or the like, but is not limited thereto.

The carbon nanotube may be a single-walled carbon nanotube (SWCNT) or a multi-walled carbon nanotube (MWCNT), and may have any one or two or more forms selected from the group consisting of a spherical type, an entangled type and a bundle type according to a manufacturing method.

The crystalline carbon 30 may have a 0-dimensional, 1-dimensional, 2-dimensional, 3-dimensional structure or a combination thereof.

The crystalline carbon 30 may be of a nano size, and specifically, may be nanoparticles, nanoporous bodies, nanowires, nanorods, or nanofibers having a particle diameter of several to hundreds of nanometers, or nano sheets.

The crystalline carbon 30 may be contained in an amount of 30 to 95 parts by weight. If the content of the silicon-containing material is less than 30 parts by weight, the volume expansion of silicon cannot be effectively alleviated, and when it exceeds 95 parts by weight, the energy density cannot be effectively improved.

In the LTO/Si/CC composite according to the present invention, pores are formed therein, but the porosity is preferably 1 to 15% based on the total volume of the composite. When the porosity is in the above range, the lifespan characteristics of the secondary battery can be greatly improved.

In addition, the LTO/Si/CC composite according to the present invention may have a specific surface area measured by the BET method of 10 $m^2/g$ or less, specifically 3 $m^2/g$ or less. This specific surface area may be due to the formed internal pores, which can help reduce the initial irreversible capacity and alleviate the volume expansion of Si.

FIGS. 2a and 2b are schematic views showing the structure of an LTO/Si/CC composite including a carbon coating layer according to another embodiment of the present invention.

Meanwhile, the LTO/Si/CC composite according to the present invention may further include a carbon coating layer 40 on the surface of the composite, as shown in FIGS. 2a and 2b. The carbon coating layer may further relieve the expansion of the composite and reduce the specific surface area, thereby improving electrical conductivity.

The content of the carbon coating layer 40 may be 1 to 40 parts by weight. When the content of the carbon coating layer is within the above range, the volume expansion of the silicon-containing material may be reduced and the lifespan characteristics of a lithium battery including the same may be improved.

At this time, the carbon coating layer 40 used may include amorphous carbon, as an example, a pitch, and specifically, may include a coal-based pitch, a petroleum-based pitch, or an organic synthetic pitch, but is not limited thereto and any available pitch can be used.

On the other hand, the manufacturing method of the LTO/Si/CC composite according to the present invention includes preparing a dispersion in which lithium titanium oxide (LTO), a silicon-containing material, crystalline carbon, and a dispersant are mixed (S10); and spray-drying the dispersion to prepare a porous lithium titanium oxide-silicon-crystalline carbon composite (S20).

Hereinafter, the present invention will be described step by step.

First, in step S10, a dispersion for the preparation of the LTO/Si/CC composite is prepared.

The dispersion may be prepared by mixing lithium titanium oxide (LTO), a silicon-containing material, crystalline carbon, and a dispersant in a dispersion solvent. Here, since the lithium titanium oxide (LTO), the silicon-containing material, and the crystalline carbon are the same as described above, a detailed description thereof will be omitted.

The dispersion solvent may be one or a mixed solvent selected from water, alcohol, benzene, toluene, pyridine, acetone, tetrahydrofuran (THF) and dimethylformaldehyde (DMF), but is not limited thereto. For example, the dispersion solvent may be water, and the dispersion may be an aqueous dispersion.

As the dispersant, a dispersing agent known in the art may be used, for example, glucose, citric acid, sucrose, or xylose may be used, but the present invention is not limited thereto.

Here, the concentration of the dispersion can be controlled by various parameters. However, for easy application to spraying equipment, easy removal of the dispersion solvent and quick drying, the dispersion contains a mixture of lithium titanium oxide (LTO), silicon-containing material, crystalline carbon and dispersant at a concentration of 10 to 50 g/L and specifically, the mixture may be contained at a concentration of 10 to 30 g/L.

The ratio of lithium titanium oxide (LTO), silicon-containing material, and crystalline carbon in the dispersion solvent may be 0.1 to 10 parts by weight, 3 to 60 parts by weight, and 30 to 95 parts by weight, respectively.

Next, in step S20, the dispersion is spray-dried to prepare a porous LTO/Si/CC composite.

The spray drying method used according to an embodiment of the present invention may be performed by supplying the precursor dispersion into a spray device to form droplets by spraying, and then drying the droplets. In this case, the spray drying device may include a spray device (droplet generating device), a reactor, and a collecting unit, but is not limited thereto.

Here, the spray drying may be spraying at room temperature/atmospheric pressure, pressurized spraying, or electrostatic spraying, but is not particularly limited in the present invention. As an example, pressurized spraying is a method of pressurizing a dispersion through a pressurized atomizer to form droplets, and then manufacturing particles through a diffusion dryer. In addition, electrostatic spraying is a method of forming droplets through an electrostatic spraying nozzle using a high voltage generator, and then producing particles through a diffusion dryer.

In an embodiment of the present invention, if the LTO/Si/CC composite is manufactured by the spray drying method, it can be manufactured in a single process, and it is easy to control the specific surface area and average pore size of the LTO/Si/CC composite according to the process conditions.

According to an embodiment of the present invention, droplets having an average diameter of 0.5 to 100 μm may be formed by the spraying, and the dispersion solvent contained in the droplets may be removed by the drying. The diameter of the droplet may be in the range of 0.5 to 100 μm, specifically, in the range of 5 to 30 μm. If the diameter of the droplet is less than 0.5 μm, the size of the resulting LTO/Si/CC composite may be too small, and if the diameter of the droplet exceeds 100 μm, the size of the resulting LTO/Si/CC composite may be too large.

The spraying speed during spray drying may be performed at a flow rate of 0.5 to 5 ml/min.

The drying process is not particularly limited as long as the temperature is higher than the temperature for the material constituting the droplets to be converted into particles (i.e., aggregates), and it can be carried out by heat treatment at a temperature range of 50 to 180° C., specifically 60 to 150° C. in which the dispersion solvent can be sufficiently removed. In this case, the drying temperature may vary depending on the dispersion solvent used.

The dried LTO/Si/CC composite may be obtained in the form of particles (powder).

Meanwhile, the step S30 of forming an additional carbon coating layer on the surface of the LTO/Si/CC composite obtained in step S20 may be further performed.

In the carbon coating layer forming step S30, the lithium titanium oxide-silicon-crystalline carbon composite obtained in step S20 is mixed with amorphous carbon, and then milled at a temperature lower than the softening point of the amorphous carbon to modify the surface of the composite (S31); and carbonizing the surface-modified lithium titanium oxide-silicon-crystalline carbon composite to form a uniform amorphous carbon coating layer on the surface of the lithium titanium oxide-silicon-crystalline carbon composite (S32).

Specifically, in step S31, the LTO/Si/CC composite obtained in step S20 may be mixed with amorphous carbon, for example, pitch, and the surface of the composite can be modified by milling the mixture at a temperature lower than the softening point of the amorphous carbon through a low-power mechanical milling method.

Thereafter, a uniform amorphous carbon coating layer may be formed on the surface of the LTO/Si/CC composite by carbonizing the surface-modified LTO/Si/CC composite in an inert atmosphere in step S32.

The formed carbon coating layer further relieves the expansion of the LTO/Si/CC composite and reduces the specific surface area, thereby improving electrical conductivity.

The LTO/Si/CC composite prepared by the above method contains a silicon-containing material and thus has a higher specific capacity than a conventional graphite material, so it can improve the energy density of the battery. In particular, by including an LTO material of a one-dimensional (1D) structure, uniform and fast electrical conductivity and lithium ion conductivity can be secured inside the composite, thereby greatly improving the fast charging (Q/C) characteristics of the secondary battery. In addition, when the composite containing internal pores is used as an anode material for a secondary battery, lifespan characteristics of the secondary battery at a high rate can also be greatly improved.

In addition, as the LTO material, which is a metal-based material, is added to the composite, the mechanical strength of the particles may be improved, and thus, the destruction of the particles during the rolling process of the electrode may be reduced.

Therefore, the composite according to the present invention can implement high capacity, high energy density, and high lifespan stability, improve fast charging characteristics, and also improve mechanical strength, so it can be usefully used as an anode active material for a lithium secondary battery.

Lithium Secondary Battery

The lithium secondary battery of the present invention may be manufactured according to a conventional method known in the art. For example, it can be prepared by putting a porous separator between a cathode and an anode and injecting an electrolyte in which lithium salt is dissolved.

Anode

The anode is prepared by mixing a solvent, if necessary, a binder, a conductive material, and a dispersant with the anode active material including the LTO/Si/CC composite as described above and stirring the mixture to prepare a slurry, and then applying or coating the slurry to the current collector of a metal material, compressing, and drying.

Here, the average particle diameter (D50) of the LTO/Si/CC composite may be about 1 μm or less, and the specific surface area by the BET method of the anode made of such an anode active material may be about 3 to 50 $m^2/g$. In order for the specific surface area of the anode to satisfy the above range, the specific surface area of the anode active material may be about 1 to 10 $m^2/g$, and the upper limit may be 6 $m^2/g$ or less, but is not limited thereto, and the specific surface area value of the conductive material may be controlled for the specific surface area of the finally prepared anode to be in the range of 3 to 50 $m^2/g$.

When the specific surface area of the anode is less than 3 $m^2/g$, the affinity between the anode and the electrolyte may be lowered, and thus the interface resistance of the anode may increase, and thus there is a possibility that the output characteristics may be deteriorated. When the specific surface area exceeds 50 $m^2/g$, the electrolyte may be biased toward the anode, and a phenomenon in which the electrolyte is relatively insufficient in the cathode may occur, and thus there is a possibility that the output characteristics may be deteriorated.

In preparing the slurry, the anode active material according to the present invention may be mixed with graphite powder, and in this case, the anode active material according to the present invention may be used in a mixing ratio of less than 30% to the graphite powder. If the mixing ratio exceeds 30%, the total amount of silicon in the anode active material increases, and there is a problem in that electrochemical performance is deteriorated due to side reactions such as volume expansion.

As the conductive material, conductive materials generally used in the art can be used without limitation. For example, the conductive material may be artificial graphite, natural graphite, carbon black, acetylene black, Ketjen black, Denka black, thermal black, channel black, carbon fiber, metal fiber, aluminum, tin, bismuth, silicon, antimony, nickel, copper, titanium, vanadium, chromium, manganese, iron, cobalt, zinc, molybdenum, tungsten, silver, gold, lanthanum, ruthenium, platinum, iridium, titanium oxide, polyaniline, polythiophene, polyacetylene, polypyrrole, or a mixture thereof.

As the binder, binders generally used in the art can be used without limitation. For example, the binder may be polyvinylidene fluoride (PVdF), polyhexafluoropropylene-polyvinylidene fluoride copolymer (PVdF/HFP), poly(vinyl acetate), polyvinyl alcohol, polyethylene oxide, polyvinylpyrrolidone, polyvinylpyridine, alkylated polyethylene oxide, polyvinyl ether, poly(methyl methacrylate), poly (ethyl acrylate), polytetrafluoroethylene (PTFE), polyvinyl chloride, polyacrylonitrile, styrene-butadiene rubber, acrylonitrile-butadiene rubber, fluororubber, ethylene-propylene-diene monomer (EPDM), sulfonated ethylene-propylene-diene monomer, carboxymethylcellulose (CMC), regenerated cellulose, starch, hydroxypropyl cellulose, tetrafluoroethylene, or a mixture thereof.

The anode current collector is generally made to have a thickness of 3 to 500 μm. Such an anode current collector is not particularly limited as long as it has conductivity without causing chemical change in the battery. For example, the anode current collector may be copper, stainless steel, aluminum, nickel, titanium, fired carbon, copper or stainless-steel surface-treated with carbon, nickel, titanium, silver, etc., aluminum-cadmium alloy, etc. In addition, like a cathode current collector, the bonding force to the anode active material may be strengthened by forming fine irregularities on the surface of the anode current collector, and the anode current collector may have various forms such as a film, a sheet, a foil, a net, a porous body, a foam, and a non-woven body.

Cathode

The cathode may be manufactured by a conventional method known in the art, and may vary depending on the specific type of the lithium secondary battery.

Specifically, when the lithium secondary battery is a lithium ion battery, the cathode may contain a cathode active material, a binder, and a conductive material. The cathode active material of the lithium ion battery may contain a lithium-transition metal oxide or a lithium-transition metal phosphate. The lithium-transition metal oxide may be a composite oxide of lithium and at least one transition metal selected from the group consisting of cobalt, manganese, nickel, and aluminum. For example, the lithium-transition metal oxide may be $Li(Ni_{1-x-y}Co_xMn_y)O_2$ ($0 \leq x \leq 1$, $0 \leq y \leq 1$, $0 \leq x+y \leq 1$), $Li(Ni_{1-x-y}Co_xAl_y)O_2$ ($0 \leq x \leq 1$, $0 \leq y \leq 1$, $0 \leq x+y \leq 1$), or $Li(Ni_{1-x-y}Co_xMn_y)_2O_4$ ($0 \leq x \leq 1$, $0 \leq y \leq 1$, $0 \leq x+y \leq 1$). The lithium-transition metal phosphate may be a composite phosphate of lithium and at least one transition metal selected from the group consisting of iron, cobalt, and nickel. As an example, the lithium-transition metal phosphate may be $Li(Ni_{1-x-y}Co_xFe_y)PO_4$ ($0 \leq x \leq 1$, $0 \leq y \leq 1$, $0 \leq x+y \leq 1$).

When the lithium secondary battery is a lithium sulfur battery, the cathode may contain a sulfur compound as a cathode active material, and may further contain a binder and a conductive material. The sulfur compound may be solid sulfur ($S_8$) and/or $Li_2S$.

When the lithium secondary battery is a lithium-air battery, the cathode may contain a carbon material, a catalyst for oxidation/reduction of oxygen, or a combination thereof. The carbon material may include carbon black (super P, ketjen black, etc.), carbon nanotubes (CNT), graphite, graphene, porous carbon, or a combination thereof. The catalyst for the oxidation/reduction of oxygen may be a transition metal, a transition metal oxide, or a transition metal carbide. The transition metal may be ruthenium (Ru), palladium (Pd), iridium (Ir), cobalt (Co), nickel (Ni), iron (Fe), silver (Ag), manganese (Mn), platinum (Pt), gold (Au), nickel (Ni), copper (Cu), aluminum (Al), chromium (Cr), titanium (Ti), silicon (Si), molybdenum (Mo) tungsten (W), or a combination thereof. The transition metal oxide may be ruthenium dioxide ($RuO_2$), iridium dioxide ($IrO_2$), tricobalt tetraoxide ($Co_3O_4$), manganese dioxide ($MnO_2$), cerium dioxide ($CeO_2$), ferric oxide ($Fe_2O_3$), Iron(II,III) oxide ($Fe_3O_4$), nickel monoxide (NiO), copper oxide (CuO), a perovskite-based catalyst, or a combination thereof. The transition metal carbide may include a titanium carbide (TiC), silicon carbide (SiC), tungsten carbide (WC), molybdenum carbide ($Mo_2C$)-based catalyst, or a combination thereof.

The cathode current collector is generally made to have a thickness of 3 to 500 μm. The cathode current collector is not particularly limited as long as it has conductivity without causing chemical change in the battery, and may be a metal that has high conductivity and can be easily adhere to a slurry of the cathode active material, and is not reactive over the voltage range of the battery. Non-limiting examples of the cathode current collector include a foil made of aluminum, nickel, or a combination thereof.

The solvent for forming the cathode may include an organic solvent such as NMP (N-methyl pyrrolidone), DMF (dimethyl formamide), acetone, and dimethyl acetamide, or water, and these solvents may be used alone or in mixture of two or more.

The amount of the solvent used is sufficient as long as it can dissolve and disperse the cathode active material, the binder, and the conductive material in consideration of the application thickness of the slurry and the production yield.

Since the conductive material and the binder are the same as described in the description of the anode, the description thereof will be omitted.

The cathode may further include a filler in the mixture, if necessary. The filler is optionally used as a component for inhibiting the expansion of the cathode, and is not particularly limited as long as it is a fibrous material without causing a chemical change in the battery. The filler may be olefin-based polymers such as polyethylene and polypropylene or a fibrous material such as glass fiber and carbon fiber.

Separator

The separator is positioned between the anode and the cathode and insulates the electrodes. The separator may be, for example, a single layer or a laminate of two or more of a conventional porous polymer film made of a polyolefin-based polymer such as ethylene homopolymer, propylene homopolymer, ethylene/butene copolymer, ethylene/hexene copolymer, and ethylene/methacrylate copolymer. Alternatively, the separator may be a conventional porous nonwoven fabric, for example, a nonwoven fabric made of high melting point glass fiber, polyethylene terephthalate fiber, etc., but is not limited thereto.

Electrolyte

The electrodes having the above structure are accommodated in the pouch case, and then the electrolyte is injected to prepare a battery.

The electrolyte may be a lithium salt-containing non-aqueous electrolyte, which is composed of a non-aqueous electrolyte and lithium. As the non-aqueous electrolyte, a non-aqueous electrolyte solution, a solid electrolyte, an inorganic solid electrolyte, and the like are used.

Examples of the non-aqueous electrolyte solution may include an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxyfuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivative, sulfolane, methyl sulfolane, 1,3-dimethyl-2-imidazolidinone, propylene carbonate derivative, tetrahydrofuran derivative, ether, methyl pyropionate, or ethyl propionate.

Examples of the organic solid electrolyte may include polyethylene derivatives, polyethylene oxide derivatives, polypropylene oxide derivatives, phosphoric acid ester polymers, poly agitation lysine, polyester sulfide, polyvinyl alcohol, polyvinylidene fluoride, a polymer containing an ionic dissociation group or the like.

Examples of the inorganic solid electrolyte may include lithium nitrides, lithium halides, lithium sulfates such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$ and the like.

The lithium salt is a material readily soluble in the non-aqueous electrolyte solution. For example, the lithium salt may be LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborane, lithium lower aliphatic carboxylate, lithium 4-phenyl borate, imide, or the like.

In addition, non-aqueous electrolyte solution may include, for the purpose of improving charge/discharge characteristics, flame retardancy, etc., pyridine, triethylphosphite, triethanolamine, cyclic ether, ethylenediamine, n-glyme, hexaphosphoric acid triamide, nitrobenzene derivatives, sulfur, quinone imine dyes, N-substituted oxazolidinones, N,N-substituted imidazolidines, ethylene glycol dialkyl ethers, ammonium salts, pyrrole, 2-methoxyethanol, aluminum trichloride, etc. In some cases, in order to impart incombustibility, a halogen-containing solvent such as carbon tetrachloride or ethylene trifluoride may be further included, and carbon dioxide gas may be further included to improve high-temperature storage characteristics.

Battery Module

The lithium secondary battery according to the present invention can be used not only in a battery module used as a power source for a small device, but also as a unit battery in a medium or large battery pack including a plurality of batteries. The battery module according to another embodiment of the present invention may include the above-described lithium secondary battery as a unit cell, and the battery pack according to another embodiment of the present invention may include the battery module.

Examples of the medium-large device include, but are not limited to, an electric vehicle, a hybrid electric vehicle, a plug-in hybrid electric vehicle, and a system for power storage.

The battery case commonly used in the art may be adopted to the battery case of the present invention, and there is no limitation in the external shape according to the use of the battery. For example, the external shape may be cylindrical or prismatic using a can, pouch type or coin type, etc.

Hereinafter, preferred examples are provided to aid the understanding of the present invention. However, the following experimental example is only for helping understanding of the present invention, and the present invention is not limited by the following experimental example.

Composite Preparation Examples: Preparation Examples 1~4 and Comparative Examples 1-2

Preparation Example 1: Preparation of LTO NPs/Si/CC Composite 1 part by weight of Li$_4$Ti$_5$O$_{12}$ nanoparticles (LTO NPs), 35 parts by weight of Si nanoparticles, and 59 parts by weight of graphite flakes were put in water, and 5 parts by weight of sucrose as a dispersant was added thereto, followed by mixing to prepare a dispersion. The dispersion was spray-dried to prepare a porous LTO NPs/Si/CC composite having an average particle diameter of about 5 μm.

Preparation Example 2: Preparation of LTO NFs/Si/CC Composite

A porous LTO NFs/Si/CC composite having an average diameter of about 5 μm was prepared in the same manner as in Preparation Example 1, except that Li$_4$Ti$_5$O$_{12}$ nanofibers (LTO NFs) of the 1D structure of FIG. 3 were used instead of Li$_4$Ti$_5$O$_{12}$ nanoparticles. Here, the Li$_4$Ti$_5$O$_{12}$ nanofibers were prepared by electrospinning the Li$_4$Ti$_5$O$_{12}$ nanoparticles.

Preparation Examples 3-4: Preparation of LTO/Si/CC Composite Containing Carbon Coating Layer After mixing the porous LTO/Si/CC composites prepared in Preparation Example 1 or 2 with the pitch, the temperature of a batch was set to be lower than the softening point of the pitch (180° C.) and heated in advance. Thereafter, the mixture was subjected to low-power mechanical milling to modify the surface of the composite.

Thereafter, the surface-modified LTO/Si/CC composite was carbonized by heating it at 900° C. in an inert (Ar) atmosphere to form a uniform amorphous carbon coating layer on the surface of the LTO/Si/CC composite.

Comparative Example 1: Preparation of Si/Gr Composite

Without adding Li$_4$Ti$_5$O$_{12}$, 35 parts by weight of Si nanoparticles and 60 parts by weight of Gr (graphite) were put into water, 5 parts by weight of sucrose as a dispersant was added thereto, followed by mixing to prepare a dispersion. The dispersion was spray dried to obtain a porous particle of a Si/Gr composite having an average diameter of 5 μm.

Comparative Example 2: Preparation of Si/Gr Composite Containing Carbon Coating Layer The method of Preparation Example 3 was performed on the porous Si/Gr composite of Comparative Example 1 to prepare a Si/Gr composite in which a carbon coating layer was formed on the surface of the Si/Gr composite.

Images taken with a scanning electron microscope (SEM) of the outside and cross-section of the prepared LTO NPs/Si/CC composite are shown in FIGS. 4 and 5, respectively. In addition, an image taken by a SEM of the prepared LTO NFs/Si/CC composite is shown in FIG. 6.

FIG. 4 is a scanning electron microscope (SEM) image of the LTO NPs/Si/CC composite according to Preparation Example 1 of the present invention.

As shown in FIG. 4, it was confirmed that the LTO NPs/Si/CC composite according to the present invention exhibited the form of rough spherical aggregates in which fine particles were aggregated.

FIG. 5 is a SEM image showing a cross-section of the LTO NPs/Si/CC composite according to Preparation Example 1 of the present invention.

Referring to FIG. 5, it can be seen that the LTO NPs/Si/CC composite according to the present invention has spherical LTO particles, silicon particles and plate-shaped graphite particles uniformly distributed therein, and has uniform pores therein.

FIG. 6 is a SEM image of the LTO NFs/Si/CC composite according to Preparation Example 2 of the present invention.

Referring to FIG. 6, the LTO NFs/Si/CC composite according to the present invention also shows the form of a rough spherical aggregate in which fine particles are aggregated. It can be seen that the 1D structure of LTO nanofibers appears in a part of the aggregate, confirming that the LTO NFs/Si/CC composite is successfully prepared, and it can be seen that the LTO nanofibers in the LTO NFs/Si/CC composite are present in the aggregate without a change in shape.

The carbon coating layer-formed LTO/Si/CC composites prepared in Preparation Examples 3 and 4 were observed with a SEM and a transmission electron microscope (TEM), and the images are shown in FIGS. 7a, 7b and 8.

FIG. 7a is a SEM image of the LTO/Si/CC composite including a carbon coating layer according to Preparation Example 3 of the present invention, and FIG. 7b is a SEM image of the LTO/Si/CC composite including a carbon coating layer according to Preparation Example 4 of the present invention.

Here, FIG. 7a shows the LTO NPs/Si/CC composite of Preparation Example 3, and FIG. 7b shows the LTO NFs/Si/CC composite of Preparation Example 4.

Referring to FIGS. 7a and 7b, it can be seen that in both composites, a carbon coating layer is formed so that the surface of the composite is smooth.

FIG. 8 is a TEM image showing a cross section of an LTO NPs/Si/CC composite including a carbon coating layer according to Preparation Example 3 of the present invention.

Referring to FIG. 8, it can be seen that an amorphous carbon coating layer is formed on the surface of the LTO NPs/Si/CC composite.

The BET specific surface area of the composite including the carbon coating layer of Preparation Examples 3-4 and Comparative Examples 2 is shown in Table 1 below.

TABLE 1

|  | Preparation Example 3 (LTO NPs/Si/CC) | Preparation Example 4 (LTO NFs/Si/CC) | Comparative Example 2 (Si/Gr) |
|---|---|---|---|
| BET specific surface area (m$^2$/g) | 1.696 | 2.92 | 2.92 |

As shown in Table 1, the composites in which the amorphous carbon layer was coated on the surface according to the present invention showed a BET specific surface area of 10 m$^2$/g or less, specifically 3 m$^2$/g or less. These composites can reduce the initial irreversible capacity and help alleviate the Si volume expansion.

Secondary Battery Preparation Example: Preparation Examples 5 and 6 and Comparative Example 3

Preparation Example 5: Preparation of a Lithium Secondary Battery Using the LTO NPs/Si/CC Composite as an Anode Active Material 1 part by weight of carboxymethyl cellulose (CMC) and 1.5 parts by weight of styrene-butadiene rubber (SBR) as binders, 0.5 parts by weight of acetylene black as a conductive material, and 97 parts by weight of the porous LTO NPs/Si/CC composite prepared in Preparation Example 3 as an anode active material were mixed with water to prepare a slurry for electrode coating.

The prepared slurry was coated on a copper foil as a current collector to prepare an anode. A porous separator was placed between the anode and a cathode including LiCoO$_2$, and an electrolyte in which lithium salt was dissolved was added, and then an upper plate was placed and pressed to prepare a lithium secondary battery.

Preparation Example 6: Preparation of a Lithium Secondary Battery Using the LTO NFs/Si/CC Composite as an Anode Active Material Using the LTO NFs/Si/CC composite of Preparation Example 4 instead of the LTO NPs/Si/CC composite of Preparation Example 3, a lithium secondary battery was prepared in the same manner as in Preparation Example 5.

Comparative Example 3: Preparation of a Lithium Secondary Battery Using a Si/Gr Composite as an Anode Active Material A lithium secondary battery was prepared in the same manner as in Preparation Example 5 by using the Si/Gr composite of Comparative Example 2 instead of the LTO NPs/Si/CC composite of Preparation Example 3.

Comparative Example 4: Preparation of a Lithium Secondary Battery Using Graphite as an Anode Active Material Using only graphite powder without the LTO NPs/Si/CC composite of Preparation Example 3, a lithium secondary battery was prepared in the same manner as in Preparation Example 5.

Experimental Examples

Experimental Example: Measurement of Charging Capacity, Charging Voltage, and Discharging Capacity According to Charging Speed During Constant Current Method Charging/Discharging FIG. 9 is a graph illustrating a charging voltage profile during fast charging or slow charging of a battery charged by a general CC-CV (constant current-constant voltage) method.

As shown in FIG. 9, in a general commercial battery charged through the CC-CV (constant current-constant voltage) method, most of the charging proceeds by the CC (constant current) method during low-speed charging, and in this case, the charging voltage gradually increases, and, when the limit voltage is reached, it is charged by the CV (constant voltage) method. On the other hand, during fast charging, the charging voltage rises rapidly due to loads such as IR-drop, cell polarization, and charge transfer resistance on the battery, so the time to reach the limit voltage is short, and thereafter, CV charging proceeds.

However, in the CV charging section, as the battery generates heat, side reactions increase and the charging time cannot be controlled. Accordingly, there is a need for developing an electrode capable of sustaining a longer CC (constant current) charging even during fast charging.

Accordingly, for the lithium secondary battery using the composites prepared according to Preparation Examples and Comparative Examples of the present invention as an anode active material, the charging performance during fast charging was measured as follows.

(1) Change in Voltage According to Charging Rate

FIGS. 10a to 10d are graphs showing the voltage profile according to the charging rate during constant-current charging of a battery using a composite according to Preparation Examples or Comparative Examples of the present invention as an anode active material, and a cathode including LiCoO$_2$ (FIG. 10a: graphite (Comparative Example 4), FIG. 10b: Si/Gr composite (Comparative Example 3), FIG. 10c: LTO NPs/Si/CC composite (Preparation Example 5), FIG. 10D: LTO NFs/Si/CC composite (Preparation Example 6)).

As shown in FIGS. 10a to 10d, in all four cases, the speed of reaching the limit voltage increased as the charging speed increased. When the limit voltage is reached, since charging proceeds by CV (constant voltage) method, the charging capacity when the limit voltage is reached was measured and shown in FIG. 11 and Table 2.

TABLE 2

| | Quantified Charging Capacity (100% at 0.2 C) | | | | |
|---|---|---|---|---|---|
| | 0.2 C | 0.5 C | 1.0 C | 2.0 C | 3.0 C |
| graphite (Comparative Example 4) | 100 | 91.03 | 69.31 | 36.55 | 13.79 |
| Si/Gr (Comparative Example 3) | 100 | 90.51 | 73.65 | 42.57 | 19.59 |
| LTO NPs/Si/CC (Preparation Example 5) | 100 | 92.22 | 83.57 | 58.99 | 28.88 |
| LTO NFs/SI/CC (Preparation Example 6) | 100 | 93.86 | 85.48 | 66.89 | 33.21 |

FIG. 11 is a graph showing the quantified charging capacity (%) at the limit voltage when the charging rate is changed during constant-current charging of a battery using each composite according to Preparation Examples and Comparative Examples as an anode active material.

Referring to FIG. 11 and Table 2, the lithium secondary batteries (Preparation Examples 5 and 6) using the LTO/Si/CC composite as an anode active material have a charging rate of 80% at 1.0 C, which is 5 times faster at 0.2 C. Comparing this with the charging capacity of about 70% of the Si/Gr composite that does not contain LTO or graphite alone as an anode active material, it can be seen that the fast charging performance is improved. In particular, the LTO/Si/CC composites according to the present invention exhibited a larger charging capacity than the Si/Gr composite of Comparative Example 3 even at high-speed charging rates of 2.0 C and 3.0 C, and it can be seen that the fast charging capacity is further improved when the LTO is a one-dimensional nanofiber than when the LTO is a nanoparticle.

Therefore, the LTO/Si/CC composite according to the present invention has improved constant current charging performance during high-speed charging compared to the conventional anode active material, and thus can be usefully used for next-generation secondary batteries requiring high-speed charging.

(2) Discharge Capacity According to Discharge Rate

For lithium secondary batteries using composites prepared according to Preparation Examples and Comparative Examples of the present invention as anode active materials, the discharge performance according to the discharge rate was measured and shown in FIG. 12 and Table 3.

TABLE 3

| | Quantified Charging Capacity (100% at 0.2 C) | | | | |
|---|---|---|---|---|---|
| | 0.2 C | 0.5 C | 1.0 C | 2.0 C | 3.0 C |
| graphite (Comparative Example 4) | 100 | 97.38 | 93.93 | 69.55 | 37.87 |

TABLE 3-continued

| | Quantified Charging Capacity (100% at 0.2 C) | | | | |
|---|---|---|---|---|---|
| | 0.2 C | 0.5 C | 1.0 C | 2.0 C | 3.0 C |
| Si/Gr (Comparative Example 3) | 100 | 96.20 | 92.76 | 77.70 | 48.63 |
| LTO NPs/Si/CC (Preparation Example 5) | 100 | 96.13 | 92.52 | 78.33 | 47.02 |
| LTO NFs/SI/CC (Preparation Example 6) | 100 | 96.11 | 92.67 | 76.42 | 46.85 |

FIG. 12 is a graph showing the quantified discharge capacity (100% based on 0.2 C) according to the discharge rate during discharging of a battery using each composite according to Preparation Examples and Comparative Examples as an anode active material.

Referring to FIG. 12 and Table 3, the lithium secondary battery using the LTO/Si/CC composite according to the present invention as an anode active material has a quantified discharge of 76.42 to 78.33% at 2.0 C, which is 10 times faster than the basic 0.2 C. This is higher than the quantified discharge capacity of 69.55% when graphite alone is used as the anode active material. In addition, compared with the Si/Gr composite of Comparative Example, it can be seen that the same level of discharge capacity was exhibited.

Therefore, it can be seen that the LTO/Si/CC composite according to the present invention has improved fast charging capacity and an equivalent level of fast discharging capacity, as compared to the conventional anode active material, thereby improving overall fast charging performance. The LTO/Si/CC composite according to the present invention may be usefully used in a next-generation secondary battery requiring high-speed charging.

In the above, the present invention has been described in detail with reference to preferred embodiments, but the present invention is not limited to the above embodiments, and various modifications and changes by those skilled in the art is possible within the spirit and scope of the present invention.

EXPLANATION OF REFERENCE NUMBERS

100: LTO/Si/CC composite,
10: lithium titanium oxide (LTO) nanoparticles
11: lithium titanium oxide (LTO) nanofiber,
20: silicon
30: crystalline carbon,
40: carbon coating layer

The invention claimed is:

1. An anode active material comprising a lithium titanium oxide-silicon-crystalline carbon composite which is a composite in which lithium titanium oxide (LTO), a silicon-containing material, and crystalline carbon are uniformly mixed, and is a porous spherical particle having a plurality of pores therein,
wherein the lithium titanium oxide is a one-dimensional nanowire, nanorod or nanofiber.

2. The anode active material of claim 1, wherein the silicon-containing material is silicon, silicon oxide, silicon carbide, a silicon alloy, or a combination thereof.

3. The anode active material of claim 1, wherein the silicon-containing material is a zero-dimensional nanoparticle or nanoporous body, or a one-dimensional nanowire, nanorod, or nanofiber.

4. The anode active material of claim 1, wherein a content of the silicon-containing material is 3 to 60 parts by weight.

5. The anode active material of claim 1, wherein the lithium titanium oxide is represented by the following Formula 1:

  [Formula 1]

in Formula 1, 0.1≤x≤4, 1≤y≤5 and 2≤z≤12.

6. The anode active material of claim 1, wherein the lithium titanium oxide is selected from the group consisting of $Li_4Ti_5O_{12}$, $LiTi_2O_4$, $Li_2TiO_3$ and $Li_2Ti_3O_7$.

7. The anode active material of claim 1, wherein a content of the lithium titanium oxide is 0.1 to 10 parts by weight.

8. The anode active material of claim 1, wherein the crystalline carbon is selected from the group consisting of graphene, graphite, expanded graphite, and carbon nanotubes (CNT).

9. The anode active material of claim 1, wherein a content of the crystalline carbon is 30 to 95 parts by weight.

10. The anode active material of claim 1, further comprising a carbon coating layer on a surface of the composite.

11. A method of manufacturing an anode active material comprising:
preparing a dispersion solution in which lithium titanium oxide (LTO), a silicon-containing material, crystalline carbon, and a dispersant are uniformly mixed (S10); and
spray-drying the dispersion to prepare a porous lithium titanium oxide-silicon-crystalline carbon composite (S20),
wherein the lithium titanium oxide is a one-dimensional nanowire, nanorod or nanofiber.

12. The method of claim 11, further comprising:
mixing the lithium titanium oxide-silicon-crystalline carbon composite obtained in step S20 with amorphous carbon, and then modifying a surface through a milling method to obtain a surface-modified lithium titanium oxide-silicon-crystalline carbon composite (S31); and
carbonizing the surface-modified lithium titanium oxide-silicon-crystalline carbon composite to form a uniform amorphous carbon coating layer on the surface of the lithium titanium oxide-silicon-crystalline carbon composite (S32).

13. An electrode comprising:
an active material including a lithium titanium oxide-silicon-crystalline carbon composite,
wherein the composite is a composite in which lithium titanium oxide (LTO), a silicon-containing material, and crystalline carbon are uniformly mixed, and is a porous spherical particle having a plurality of pores therein,
wherein the lithium titanium oxide is a one-dimensional nanowire, nanorod or nanofiber.

14. A lithium secondary battery comprising:
an anode coated with an anode active material of claim 1;
a cathode positioned opposite to the anode; and
an electrolyte disposed between the anode and the cathode.

* * * * *